(12) United States Patent
Tipton et al.

(10) Patent No.: US 9,594,798 B2
(45) Date of Patent: *Mar. 14, 2017

(54) FILE SYSTEM WITH PER-FILE SELECTABLE INTEGRITY

(71) Applicant: Microsoft Technology Licensing, LLC, Redmond, WA (US)

(72) Inventors: William Tipton, Seattle, WA (US); Surendra Verma, Seattle, WA (US); Thomas J. Miller, Yarrow Point, WA (US); Jonathan M. Cargille, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/933,066

(22) Filed: Nov. 5, 2015

(65) Prior Publication Data

US 2016/0140161 A1   May 19, 2016

Related U.S. Application Data

(63) Continuation of application No. 13/742,339, filed on Jan. 15, 2013, now Pat. No. 9,183,246.

(51) Int. Cl.
*G06F 17/30* (2006.01)

(52) U.S. Cl.
CPC ............... *G06F 17/30371* (2013.01)

(58) Field of Classification Search
CPC ................................. G06F 17/30371
USPC ........................................ 707/694
See application file for complete search history.

(56) References Cited

U.S. PATENT DOCUMENTS

| | | |
|---|---|---|
| 5,182,805 A | 1/1993 | Campbell |
| 5,752,251 A | 5/1998 | Cripps |
| 6,393,435 B1 * | 5/2002 | Gartner ............. G06F 17/30575 |
| 6,678,700 B1 * | 1/2004 | Moore ............. G06F 17/30233 |
| 6,721,764 B2 | 4/2004 | Hitz et al. |

(Continued)

OTHER PUBLICATIONS

"Btrfs design", states "Revision as of Dec. 11, 2010", Retrieved From <<https://btrfs.wiki.kernel.org/index.php?title=Btrfs_design&oldid=4362>>, May 27, 2015, 9 Pages.

(Continued)

*Primary Examiner* — Noosha Arjomandi
(74) *Attorney, Agent, or Firm* — Sunah Lee; Dan Choi; Micky Minhas

(57) ABSTRACT

A file system uses data integrity techniques that are a selectable attribute of a file system object. Some file system objects have integrity on for various accesses, while other file system objects do not. Different default settings can be provided for different file system objects. Such a setting for a file system object can be changed to and from having integrity on. Given a file system object with an attribute, the file system provides file system operations for which the data integrity operation used on the file system object depends on this attribute. Such operations include, but are not limited to, operations for changing the attribute, creating file system objects with such attributes, providing and changing default settings for such attributes, and writing data to and reading data from files, which use different data integrity techniques based on this attribute.

18 Claims, 4 Drawing Sheets

(56) References Cited

U.S. PATENT DOCUMENTS

| | | | |
|---|---|---|---|
| 7,085,909 B2 | 8/2006 | Ananthanarayanan et al. | |
| 7,240,336 B1* | 7/2007 | Baker | G06F 9/455 714/E11.207 |
| 7,441,081 B2 | 10/2008 | Humlicek | |
| 7,584,261 B1* | 9/2009 | Teodosiu | G06F 8/60 709/217 |
| 7,849,057 B1* | 12/2010 | Kazar | G06F 17/30088 707/637 |
| 7,882,068 B2 | 2/2011 | Schack et al. | |
| 7,991,748 B2 | 8/2011 | Rowan et al. | |
| 8,140,964 B2 | 3/2012 | Cragun et al. | |
| 8,281,293 B2 | 10/2012 | Fulton et al. | |
| 8,386,835 B2 | 2/2013 | Dilger et al. | |
| 8,554,734 B1 | 10/2013 | Chatterjee et al. | |
| 8,706,701 B1 | 4/2014 | Stefanov et al. | |
| 2003/0131197 A1* | 7/2003 | Morrison | G06F 11/1004 711/130 |
| 2003/0158834 A1 | 8/2003 | Sawdon et al. | |
| 2003/0158861 A1 | 8/2003 | Sawdon et al. | |
| 2005/0004925 A1 | 1/2005 | Stahl et al. | |
| 2005/0065962 A1 | 3/2005 | Rowan et al. | |
| 2006/0047925 A1 | 3/2006 | Perry | |
| 2006/0074989 A1* | 4/2006 | Laborczfalvi | G06F 9/443 |
| 2006/0090171 A1* | 4/2006 | Laborczfalvi | G06F 9/4443 719/328 |
| 2006/0248213 A1* | 11/2006 | Sherer | H04L 29/06027 709/231 |
| 2007/0044151 A1 | 2/2007 | Whitmore | |
| 2007/0067321 A1* | 3/2007 | Bissett | G06F 9/5027 |
| 2007/0106677 A1* | 5/2007 | Moore | G06F 11/1435 |
| 2007/0240219 A1* | 10/2007 | Tuvell | G06F 21/56 726/24 |
| 2008/0208924 A1* | 8/2008 | Bradshaw | G06F 21/6218 |
| 2008/0263043 A1 | 10/2008 | Kurichiyath et al. | |
| 2009/0024827 A1 | 1/2009 | Davis | |
| 2009/0077097 A1* | 3/2009 | Lacapra | G06F 17/302 |
| 2009/0157716 A1* | 6/2009 | Kim | G06F 17/30008 |
| 2009/0323940 A1* | 12/2009 | Moffat | H04L 9/0894 380/44 |
| 2010/0223394 A1* | 9/2010 | Sherer | H04L 29/06027 709/231 |
| 2010/0228737 A1 | 9/2010 | Riemers | |
| 2010/0293142 A1 | 11/2010 | Ackerman et al. | |
| 2011/0022801 A1 | 1/2011 | Flynn | |
| 2011/0055184 A1* | 3/2011 | Buban | G06F 17/3007 707/704 |
| 2011/0082838 A1* | 4/2011 | Niemela | G06F 11/1458 707/654 |
| 2011/0191394 A1* | 8/2011 | Winteregg | G06F 17/30 707/822 |
| 2012/0110338 A1 | 5/2012 | Druschel et al. | |
| 2013/0041872 A1* | 2/2013 | Aizman | G06F 17/30194 707/690 |
| 2013/0054530 A1 | 2/2013 | Baker et al. | |
| 2013/0103644 A1 | 4/2013 | Shoens | |
| 2013/0179480 A1 | 7/2013 | Agarwal et al. | |
| 2014/0181051 A1 | 6/2014 | Montulli et al. | |
| 2014/0188804 A1 | 7/2014 | Gokhale et al. | |
| 2014/0188812 A1 | 7/2014 | Vijayan | |
| 2016/0092467 A1 | 3/2016 | Lee et al. | |

OTHER PUBLICATIONS

"Basic Commands—Fedora Wiki", Retrieved From <<http://fedora.wikia.com/wiki/Basic_Commands>>, May 27, 2015, 2 Pages.
"Btrfs design", Retrieved From <<https://btrfs.wiki.kernel.org/index.php/Btrfs_design>>, Jan. 11, 2015, 8 Pages.
"Btrfs design, states Revision as of Oct. 22, 2012", Retrieved From <<https://btrfs.wiki.kernel.org/index.php?title=Btrfs_design&oldid=14011>>, May 27, 2015, 8 Pages.
"Btrfs(command)", Retrieved From <<https://btrfs.wiki.kernel.org/index.php/Btrfs(command)>>, May 1, 2015, 5 Pages.
"Changelog—btrfs Wiki", Retrieved From <<https://btrfs.wiki.kernel.org/index.php/Changelog>>, May 26, 2015, 19 Pages.
"Chattr( 1 )—Linux manual page", Retrieved From <<http://man7.org/linux/man-pages/man1/chattr.1.html>>, May 27, 2015, 5 Pages.
"DavidFarning/fedorafaqBasics", Retrieved From <<https://fedoraproject.org/wiki/DavidFarning/fedorafaqBasics>>, May 24, 2008, 3 Pages.
"FAQ", Retrieved From <<https://btrfs.wiki.kernel.org/index.php?title=FAQ&oldid=16151>>, Jan. 4, 2013, 17 Pages.
"FAQ—btrfs Wiki", Retrieved From <<https://btrfs.wiki.kernel.org/index.php/FAQ>>, May 1, 2015, 22 Pages.
"FAQ,—Revision as of Aug. 29, 2011", Retrieved From <<https://btrfs.wiki.kernel.org/index.php?title=FAQ&oldid=7682>>, 12 Pages.
"Fedora 20 Installation Guide", Retrieved From <<https://docs.fedoraproject.org/en-US/Fedora/20/html/Installation_Guide/>>, 2013, 290 Pages.
"Fedora Project—5.1 0.2 Moving Files and Directories", Retrieved From <<https://docsfedoraproject.org/en-US/Fedora/13/html/Security-Enhanced_Linux/sect-Security-Enhanced_Linux-Maintaining_SELinux_Labels_-Moving_Files_and_Directories.html>>, Retrieved Date: May 1, 2015, 1 Page.
"Fedora Project—9.14.4 Creates a Btrfs Volume", Retrieved From <<https://docs.fedoraproject.org/en-US/Fedora/19/html/Installation_Guide/Create_Btrfs-x86.html>>, May 1, 2015, 2 Pages.
"Fedora Project—Creating a Custom Partition Layout", Retrieved From <<https://docs.fedoraproject.org/en-US/Fedora/20/html/Installation_Guide/s1-diskpartitioning-x86.html>>, Retrieved Date: May 1, 2015, 4 Pages.
"Fedora Project : "Chapter 2. Obtaining Fedora"", Retrieved From <<https://docs.fedoraproject.org/en-US/Fedora/20/html/Installation_Guide/ch-new-users.html>>, Retrieved Date: May 1, 2015, 4 Pages.
"Fedora Project.—18.2.2 Removing Software", Retrieved From <<https://docs.fedoraproject.org/en-US/Fedora_Draft_Documentation/0.1/html/User_Guide/sect-User_Guide-Using_the-command_line_interface-Removing_software.html>>, Retrieved Date: May 1, 2015, 1 Page.
"Fedora Project. "Btrfs"", Retrieved From <<https://fedoraproject.org/wiki/Btrfs>>, Retrieved Date: May 1, 2015, 2 Pages.
"Glossary—btrfs Wiki", Retrieved From <<https://btrfs.wiki.kernel.org/index.php/Glossary>>, Retrieved Date: May 1, 2015, 6 Pages.
"Main Page—BTRFS Wiki", Retrieved From <<https://btrfs.wiki.kernel.org/index.php/Main_Page>>, Retrieved Date: May 1, 2015, 5 Pages.
"Revision history of FAQ", Retrieved From <<https://btrfs.wiki.kernel.org/index.php?title=FAQ&action=history>>, Retrieved Date: May 27, 2015, 3 Pages.
"Revision history of Btrfs design", Retrieved From <<https://btrfs.wiki.kernel.org/index.php?title=Btrfs_design&action=history>>, Retrieved Date: May 27, 2015, 2 Pages.
"Welcome to Fedora 20", Retrieved From <<https://admin.fedoraproject.org/docs-backend/en-US/Fedora/20/html/Release_Notes/sect-Release_Notes-Welcome_to_Fedora_20.html>>, Retrieved Date: May 1, 2015, 3 Pages.
"Non-final Office Action Issued in U.S. Appl. No. 13/742,339", Mailed Date : Jul. 18, 2014, 11 Pages.
"Notice of Allowance Issued in U.S. Appl. No. 13/742,339", Mailed Date : Feb. 27, 2015, 15 Pages.
"Notice of Allowance Issued in U.S. Appl. No. 13/742,339", Mailed Date : Jun. 26, 2015, 9 Pages.
Lee, et al., "WIPS : A Write-in-Place Snapshot File System for Storage-class Memory", In Proceedings of Electronics Letters, vol. 48, Issue 17, Aug. 16, 2012, 2 Pages.
Murray, Kate, "It's Not Just Integrity: Fixity Data in Digital Sound and Moving Image Files", Retrieved From <<https://blogs.loc.gov/digitalpreservation/2014/03/its-not-just-integrity-fixity-data-in-digital-sound-and-moving-image-files/>>, Mar. 4, 2014, 3 Pages.
Pace, Alberto, "Technologies for Large Data Management in Scientific Computing", Retrieved at <<https://cds.cern.ch/record/1630387/files/CERN-IT-2013-005.pdf>>, Sep. 30, 2013, 64 Pages.

(56) References Cited

OTHER PUBLICATIONS

Sinofsky, Steven, "Building the next generation file system for Windows: ReFS", Retrieved From <<https://blogs.msdn.microsoft.com/b8/2012/01/16/building-the-next-generation-file-system-for-windows-refs/>>, Jan. 16, 2012, 50 Pages.

Sivathanu, et al., "Ensuring Data Integrity in Storage: Techniques and Applications", In Proceedings of the ACM workshop on Storage security and survivability, Nov. 11, 2005, 11 Pages.

Zhang, et al., "End-to-end Data Integrity for File Systems: A ZFS Case Study", In Proceedings of the 8th USENIX conference on File and storage technologies, Feb. 23, 2010, 14 Pages.

\* cited by examiner

FILE SYSTEM WITH PER-FILE SELECTABLE INTEGRITY

CROSS-REFERENCE TO RELATED APPLICATIONS

This application is a continuation of U.S. patent application Ser. No. 13/742,339, filed Jan. 15, 2013, to be issued as U.S. Pat. No. 9,183,246 on Nov. 10, 2015, which is hereby incorporated by reference.

BACKGROUND

A file system in a computer generally is part of the operating system that manages access to one or more storage devices. The file system provides an interface through which other applications can create files, write data to files and read data from files stored on the storage devices. The file system provides an abstraction layer between the details of managing the storage devices, such as the actual storage locations within each device where data is stored, and applications. This abstraction layer allows applications to identify files and access to files using references to files and locations within to files, without the need for the application to have information about the actual storage locations on the storage devices or other details about the storage devices. Typically, the references to files are defined as combinations of various file system objects, such as a name of a storage device or collection of storage devices, names of directories and paths of directories, names of file streams and files, or other types of file system objects. Each file system object generally is a named construct that represents data stored within the file system.

Within the file system, when data for a file is stored, it generally is broken into small chunks (often called blocks) which are stored on the storage device. The file system generally tracks, for each file, the storage locations within the storage device where each block of a file is stored, and the ordering of those blocks.

Some file systems, when writing data in a file, modify the data within the allocated blocks for the file. This is called "in-place" writing. Other file systems, when writing data in a file, are configured to provide a level of data integrity. For example, the file system may compute and store checksums of the stored data. As another example, "copy-on-write" can be used, which involves writing data to a free block of storage in a storage device, then change the file-to-block mapping to refer to the newly written block, with the overwritten data block being discarded. Both checksums and copy-on-write can be used, as well as other techniques for providing data integrity. While providing increased data integrity, techniques such as computing checksums and performing copy-on-write can reduce performance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A file system is provided in which writing with data integrity is a selectable attribute of a file system object, such that some file system objects have integrity on for various accesses, while other file system objects do not. Different default settings can be provided for different file system objects. For example, different default setting can be provided for different files in different directories, and for different file streams within a file. Such a setting for a file system object can be changed to and from having integrity on.

Given a file system object with an attribute, the file system can provide to users and other applications various file system operations for which the data integrity operation used on the file system object depends on this attribute. Such operations include, but are not limited to, operations for changing the attribute, creating file system objects with such attributes, providing and changing default settings for such attributes, and writing data to and reading data from files, which use different data integrity techniques based on this attribute. For example, different file system objects can use different kinds of data and file integrity, such as copy-on-write, checksums and other operations, based on this attribute.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example computing environment in which a file system can be implemented.

The following description is intended to provide a brief, general description of a suitable computing environment in which a file system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, tablet and slate computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 1:
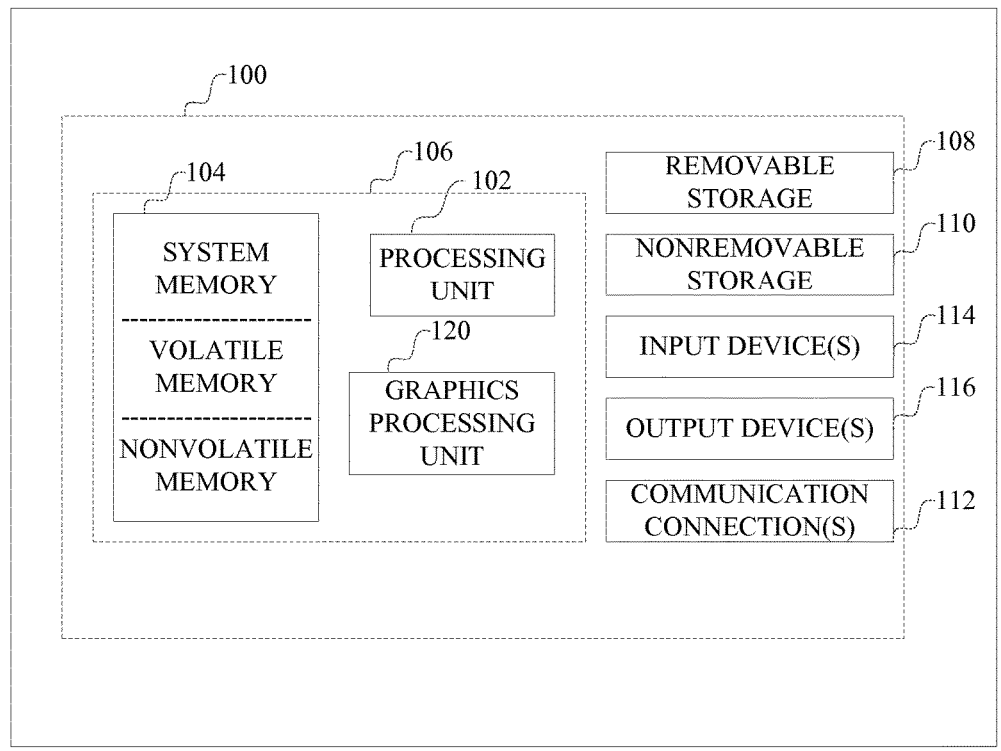
FIG. 1 is a block diagram of an example computing device in which a files system can be implemented.

FIG. 1 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 1, an example computing environment includes a computing machine, such as computing machine 100. In its most basic configuration, computing machine 100 typically includes at least one processing unit 102 and memory 104. The computing device may include multiple processing units and/or additional co-processing units such as graphics processing unit 120. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, computing machine 100 may also have additional features/functionality. For example, computing machine 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer program instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 100. Any such computer storage media may be part of computing machine 100.

Computing machine 100 may also contain communications connection(s) 112 that allow the device to communicate with other devices. Communications connection(s) 112 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 100 may have various input device(s) 114 such as a keyboard, mouse, pen, camera, touch input device, and so on. Output device(s) 116 such as a display, speakers, a printer, and so on may also be included. All of these devices are well known in the art and need not be discussed at length here. The input and output devices can provide a natural user interface, which is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Specific categories of NUI technologies on which Microsoft is working include touch sensitive displays, voice and speech recognition, intention and goal understanding, motion gesture detection, such as by using cameras and/or accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes.

A file system generally is implemented as part of an operating system of the computer, which manages access to various system resources by other computer programs. Typically, the file system and operating system are implemented using a computer program running on the computer, including computer-executable instructions and/or computer-interpreted instructions, such as program modules, being processed by the computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

Alternatively, or in addition, some of the functionality of the file system described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Given a computing machine such as described in FIG. 1, a file system can be implemented in which having integrity on is a selectable attribute of a file, such that some files on the storage device have integrity on, while other files do not. Different default settings can be provided for different file system objects. Such a setting for a file system object can be changed to and from having integrity on. An example implementation of such a file system will now be described.

Figure 2:
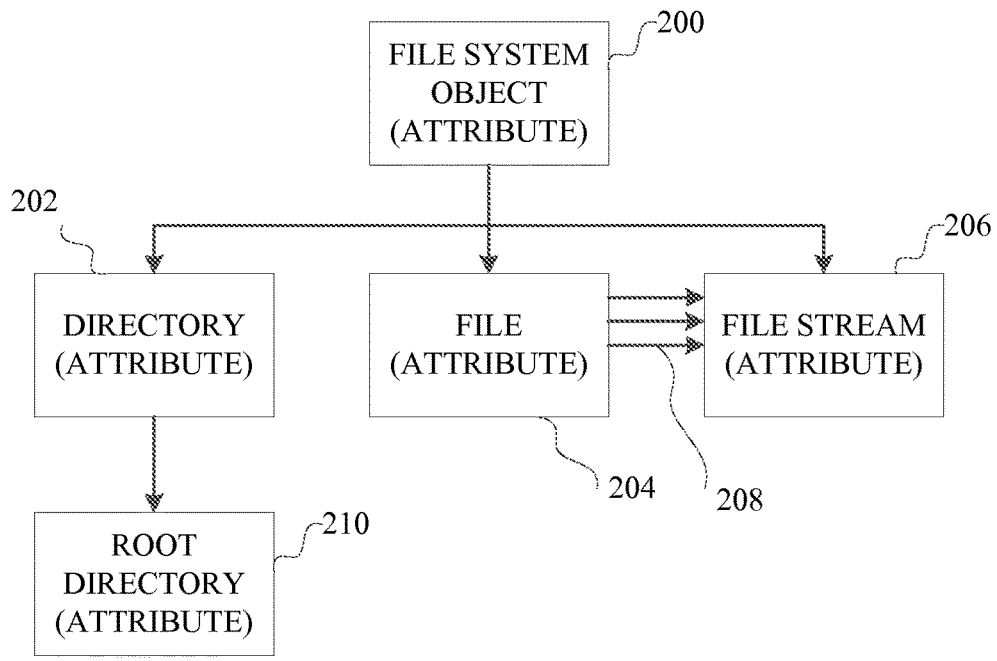
FIG. 2 is a diagram of an example class hierarchy of file system objects.
Figure 3:
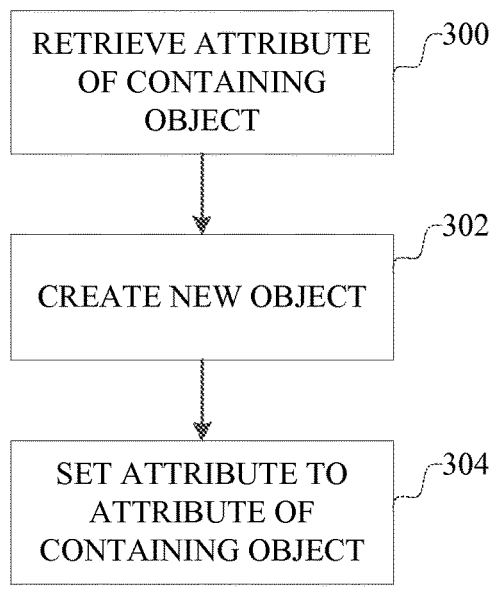
FIG. 3 is a flow chart describing an example implementation of creating a file system object.

Referring to FIG. 2 as an example implementation, the file system generally defines a set of different kinds of file system objects 200, such as a directory 202, a file 204 and file streams 206. A file 204 can include a collection of file streams 206 as indicated at 208. For example, a file can include a metadata file stream and a data file stream, each with a different integrity attribute. A root directory 210 is a special kind of directory 202, providing the top level directory of a storage system being managed. The storage system governed by the root directory can include a plurality of storage devices, but for the sake of simplicity the description herein will refer to singular storage device.

Each file system object has one or more attributes, such as a name and other attributes that depend on the implementation of the file system. The attributes of a first file system object can include default settings for other file system objects which are created and dependent on the first file system object. For example, attributes of a directory can define default settings for files and file streams created within that directory. Attributes of a file, can define default setting for file streams included within that file.

A file, file stream or other similar object can also include an extent table that lists, for each portion of the file or file stream (such as a block) various information about that block, such as its location in storage, or other data. Such other data can include a checksum or other information used to provide storage integrity.

While the foregoing describes a file system that has file system objects within an object class hierarchy, other implementations of file systems using other types of data structures to represent file system structures also can be used, and the invention is not limited to the object types described above, or to an object-oriented implementation. The term "file system object" is intended to mean any implementation of a file system structure, such as a root directory, file or the like, depending on the file system, and is not limited to object-oriented implementations.

In general, a file system allows applications and user to create, within a root directory for a storage device or set of storage devices, multiple directories and other file objects within those directories, which creates a directory tree. The name of a storage volume, and the list of names of directories containing a file system object, is called a path. A computer program accesses a file system object through the file system by providing to the file system the path that contains the desired file system object and the name of the file system object.

A file system makes available to other computer programs a variety of operations, typically through a programming interface such as function calls and the like, which operations allow storage to be accessed. A file system may include operations that initialize a storage device (also called a "volume" herein) for use, and operations that create, read, write or update, or delete file objects. A computer program performs operations on a file system object by specifying the operation and the path and name for the file system object on which the operation is to be performed.

To implement a file system which can provide data integrity as a selectable attribute of a file, in one example, a file system object is defined to have an attribute indicating the kind of behavior to be provided for the object. This attribute can be a binary value indicating that integrity is either enabled or disabled. This attribute also can be implemented using a range of values of which one or more values are indicative of integrity being enabled or disabled. The attribute can be either expressly specified or inferred from one or more other attributes. As shown in FIG. 2, this attribute can be present for each type of file system object. Each instance of each type of file system object can have a different setting for this attribute.

There are a variety of other ways to track whether a file system object has integrity on. For example, a table can be maintained in memory or storage indicating, for each file system object, whether that object has integrity on. A list of objects having integrity on can be maintained, with presence of an object in that list being indicative of it having integrity on. A characteristic of the file name, such as a file name extension indicating the type of the file, can be used to indicate that integrity is on. The type of the file system object also can be used to indicate that integrity is on. As another example, data within a file can be used to indicate this attribute as well.

Given a file system object that has an attribute indicative that integrity is on for that object, various file system operations are implemented so as to first check this attribute and then perform the operation in a manner depending on the value of that attribute. The following examples of operations will now be described: initializing a volume, creating a file system object (e.g., directory or file), writing a file, reading a file, changing the attribute for a file. This set of operations is not intended to be exhaustive, but merely illustrative of the kinds of operations that can be implemented differently depending on the attribute of a file system object.

Initializing a volume will now be described. When a volume is first mounted and its directory structure is initialized, the root directory object is created. The attribute for the root directory can be set to a default value indicating whether further file system objects created under the root directory will have integrity on.

Creating a file system object will now be described. When a file system object is created, whether a directory, file or file stream, the attribute for the directory or other file system object that will contain the object is retrieved 300. The new file system object is created 302, and its attribute is set 304 to the retrieved attribute of the containing directory.

Figure 4:
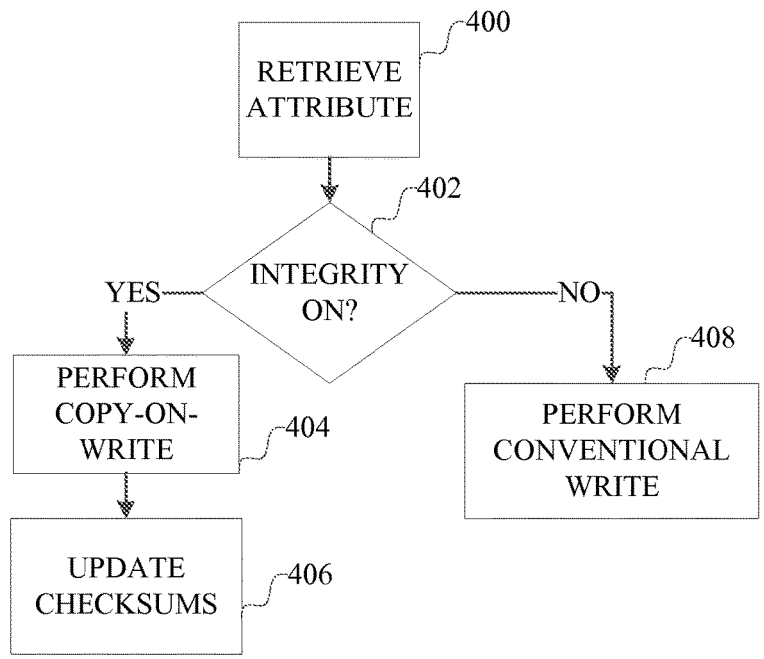
FIG. 4 is a flow chart describing an example implementation of writing data to a file system object.

Writing data to a file or similar object will now be described in connection with FIG. 4. When data is to be written to a file, the attribute for the file is retrieved 400. If the attribute indicates that integrity is on, as determined at 402, then the data is written using one or more data integrity techniques. For example, copy-on-write functionality is applied 404 to write the data. Generally, in addition, checksums for the blocks of the file to which data is written are computed and stored. If integrity is not on, then a conventional write operation is performed 408.

Figure 5:
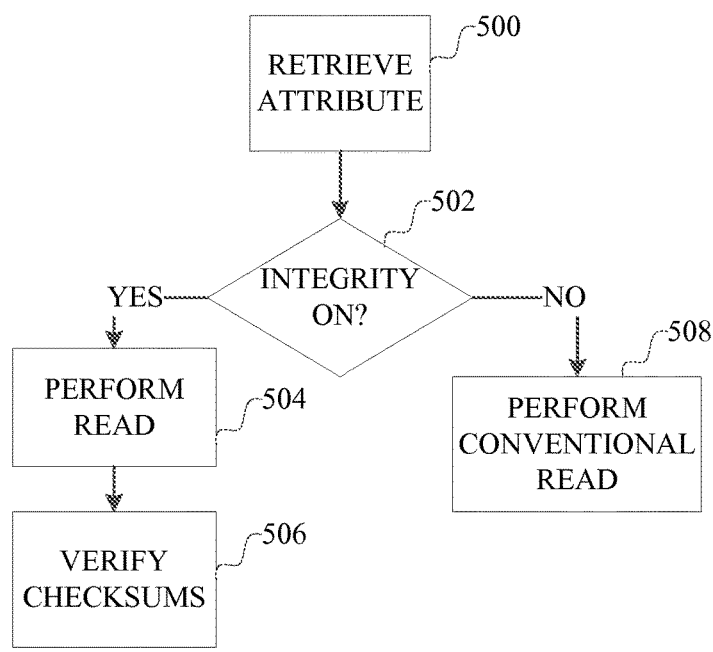
FIG. 5 is a flow chart describing an example implementation of reading data from a file system object.

Reading data from a file or similar object will now be described in connection with FIG. 5. When data is read from a file, the attribute for the file is retrieved 500. If the attribute indicates that integrity is on, as determined at 502, then the data is read 504, and any data integrity techniques are used. For example, if the data was written using checksums, a checksum is computed 506 and used to detect and allow for attempts at correction of the read data. If the attribute does not indicate that integrity is on, then a conventional data read is performed 508.

A file system command can be provided to enable a user or an application to change the attribute of a file, whether enabling or disabling integrity. In one implementation, a file that has integrity on uses a checksum for each block. These checksums can be stored in the same extent table for the file system object that stores the storage location for the object, for example. In this implementation, when integrity is disabled, the checksums are not needed. So, in this implementation, when enabling integrity, the checksums are computed and stored and the attribute is changed after the checksums are stored. When disabling integrity in this implementation, the attribute is changed, then the checksums can be discarded by deleting them (thus making storage available) or otherwise marked as invalid. Use of such checksums can be independent of copy-on-write techniques.

Figure 6:
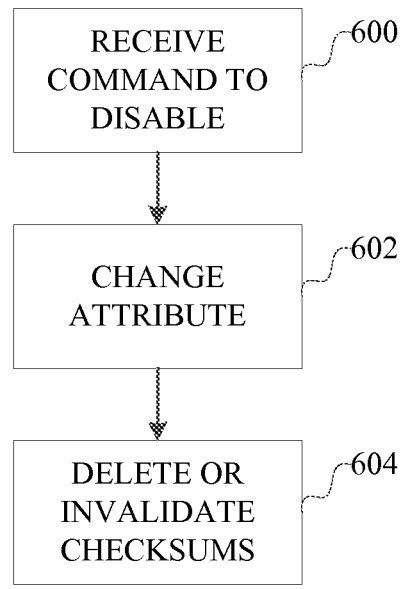
FIG. 6 is a flow chart describing an example implementation of disabling integrity for a file system object.

Changing a file system object to disable integrity will now be described in connection with FIG. 6. The file system receives 600 a command to change the attribute of a selected file system object. The file system then changes 602 the attribute of the file system object. After the change to the attribute completes without error, any additional data stored, such as checksums, for supporting integrity techniques for this file system object can be deleted or marked invalid 604. In another implementation, such checksums can be removed first and then the attribute can be changed. In such an implementation, any missing or invalid checksums for a file can be processed by treating the file, or just the corresponding block, as not having integrity on.

Figure 7:
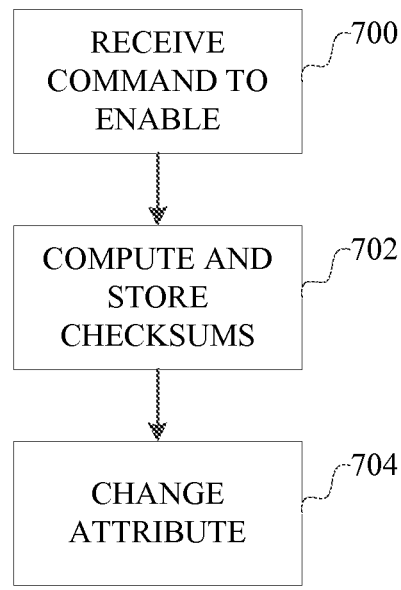
FIG. 7 is a flow chart describing an example implementation of enabling integrity for a file system object.

Changing a file system object to enable integrity techniques will now be described in connection with FIG. 7. The file system receives 700 a command to change the attribute of a selected file system object. The file system then computes 702 and stores any additional data to be stored for the file system object, such as checksums, which support the integrity techniques being used. This data can be stored, for example, in an extent table for the file system object. After the data is successfully stored, the attribute for the object then can be changed 704. In another implementation, the attribute can be changed, followed by computing the checksums. In such an implementation, any missing or invalid check sums for a file can be processed by treating the file, or just the corresponding block, as not having integrity on.

Having now described an example implementation, it should be apparent that other implementations are possible. Other types or attributes on file system objects can similarly be used to provide for different file system operations, such as providing different levels of data and file integrity, on different files based on the type or attribute of the file. It is also possible to provide such attributes for each extent within a file, to allow selectable integrity for each extent in a file.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process performed on a computer with a file system for managing storage of and access by applications, running on the computer, to a plurality of file system objects stored on at least one nonvolatile storage device, the computer comprising a processing system including memory and a processor configured to provide the file system, wherein the plurality of file system objects comprises a first file and a second file, the first file and the second file each comprising one or more bytes of data stored on the nonvolatile storage device, the process comprising:
   the file system storing, for each file system object in the plurality of file system objects, data indicating whether a copy-on-write operation is performed for write operations on the file system object;
   the file system receiving, from an application running on the computer, a request to write data to a file system object from among the plurality of file system objects stored on the nonvolatile storage device;
   the file system determining from the stored data whether a copy-on-write operation is performed for the requested file system object;
   in response to determining that the copy-on-write operation is performed for the requested file system object, the file system writing data to the requested file system object using the copy-on-write operation; and
   in response to determining that the copy-on-write operation is not performed for the requested file system object, the file system writing data to the requested file system object without using the copy-on-write operation; and
   in response to a request, the file system changing the stored data for the first file indicating whether the copy-on-write operation is performed for write operations for the first file.

2. The computer-implemented process of claim 1, wherein the stored data indicating whether the copy-on-write operation is performed comprises, for each file system object, an attribute of the file system object indicating whether applied the copy-on-write operation is performed for the file system object.

3. The computer-implemented process of claim 1, wherein the file system further receives requests to create a file system object, and wherein, upon receipt of a request to create a file system object, the file system creating the file system object with data indicating whether the copy-on-write operation is performed for the file system object according to a default value for the data.

4. The computer-implemented process of claim 1, wherein the request includes a request to disable copy-on-write for the first file.

5. The computer-implemented process of claim 1, wherein the request includes a request to enable copy-on-write on the first file.

6. The computer-implemented process of claim 1, further comprising applying a checksum while performing the copy-on-write operation for the write access.

7. A computer-implemented process performed on a computer with a file system for managing storage of and access by applications, running on the computer, to a plurality of file system objects stored on at least one nonvolatile storage device, the computer comprising a processing system including memory and a processor configured to provide the file system, wherein at least one file system object of the plurality of file system objects comprises a file comprising a plurality of extents, each extent comprising data stored on the nonvolatile storage device, the process comprising:
   the file system storing a first integrity setting applied to a first extent of the file and a second integrity setting applied to a second extent of the file; and
   the file system responding to requests from applications to access file system objects on the nonvolatile storage device, wherein access to the first extent of the file uses integrity based on the first integrity setting, and access to the second extent of the file uses integrity based on the second integrity setting.

8. The computer-implemented process of claim 7, wherein the first integrity setting is different from the second integrity setting.

9. The computer-implemented process of claim 8, wherein the first integrity setting indicates a checksum is applied to the first extent, and wherein the second integrity setting indicates no checksum is applied.

10. The computer-implemented process of claim 8, wherein the first integrity setting indicates copy-on-write is applied to the first extent, and wherein the second integrity setting indicates no copy-on-write is applied.

11. The computer-implemented process of claim 9, wherein the file system is configured to maintain in storage an extent table for the first file, the extent table storing checksums of extents of the first file.

12. The computer-implemented process of claim 7, the process further comprising, in response to a request, changing the first integrity setting to a first modified integrity setting.

13. The computer-implemented process of claim 12, wherein the first integrity setting comprises no checksum being applied, and wherein the first modified integrity setting comprises a checksum being applied.

14. The computer-implemented process of claim 13, further comprising the file system computing a checksum for the first extent prior to changing to the first modified integrity setting.

15. The computer-implemented process of claim 14, further comprising the file system changing to the first modified integrity setting then compute and store a checksum for the first extent.

16. The computer-implemented process of claim 12, wherein the first integrity setting comprises a checksum being applied, and wherein the first modified integrity setting comprises no checksum being applied.

17. The computer-implemented process of claim 16, further comprising the file system deallocating storage used to store checksums for the first extent.

18. The computer-implemented process of claim 16, further comprising the file system marking stored checksums for the first extent as invalid.

* * * * *